United States Patent
Park et al.

(10) Patent No.: US 12,210,698 B2
(45) Date of Patent: Jan. 28, 2025

(54) ELECTRONIC DEVICE INCLUDING STYLUS PEN AND OPERATION METHOD THEREFOR

(71) Applicant: SAMSUNG ELECTRONICS CO., LTD., Suwon-si (KR)

(72) Inventors: Minhoo Park, Suwon-si (KR); Dohyung Ha, Suwon-si (KR); Keemoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/457,586

(22) Filed: Aug. 29, 2023

(65) Prior Publication Data

US 2024/0028144 A1 Jan. 25, 2024

Related U.S. Application Data

(63) Continuation of application No. PCT/KR2022/001919, filed on Feb. 8, 2022.

(30) Foreign Application Priority Data

Mar. 15, 2021 (KR) .................. 10-2021-0033619

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01); *G06F 2203/0384* (2013.01)

(58) Field of Classification Search
CPC .... G06F 3/03545; G06F 3/0383; G06F 3/038; G06F 1/1626; G06F 3/033; G06F 2200/1632; G06F 1/3262; B43K 29/00
See application file for complete search history.

(56) References Cited

U.S. PATENT DOCUMENTS 7,884,811 B2 * 2/2011 Paratore .............. G06F 3/03545
 345/179
2004/0160427 A1 8/2004 Keely, Jr. et al.
(Continued)

FOREIGN PATENT DOCUMENTS

CN 206805489 U 12/2017
KR 20070096421 A 10/2007
(Continued)

OTHER PUBLICATIONS

KR-20200101680-A (Year: 2020).*
(Continued)

*Primary Examiner* — Sanjiv D. Patel
(74) *Attorney, Agent, or Firm* — NIXON & VANDERHYE P.C.

(57) ABSTRACT

An electronic device may include: a stylus pen including a first communication module and a control circuit configured to activate or inactivate the first communication module; and a pen housing which may include a second communication module and is configured to have at least a portion of the stylus pen arranged thereinside, wherein the control circuit may be configured to, in response to the at least a portion of the stylus pen being arranged inside the pen housing, inactivate the first communication module and activate the second communication module. Various other embodiments may be provided.

13 Claims, 12 Drawing Sheets

(56) References Cited

U.S. PATENT DOCUMENTS

| | | |
|---|---|---|
| 2007/0273664 A1 | 11/2007 | Kim et al. |
| 2010/0085471 A1* | 4/2010 | Craven-Bartle ...... G06F 3/0321 |
| | | 348/E5.022 |
| 2014/0362024 A1 | 12/2014 | Hicks |
| 2015/0277644 A1 | 10/2015 | Bolt et al. |
| 2015/0286298 A1 | 10/2015 | Lee et al. |
| 2015/0363012 A1* | 12/2015 | Sundara-Rajan ..... G06F 3/0441 |
| | | 345/179 |
| 2017/0269721 A1 | 9/2017 | Park |
| 2020/0103988 A1 | 4/2020 | Jeon et al. |
| 2022/0197410 A1 | 6/2022 | Kim et al. |

FOREIGN PATENT DOCUMENTS

| | | | |
|---|---|---|---|
| KR | 20070113347 A | | 11/2007 |
| KR | 20080051286 A | | 6/2008 |
| KR | 20150115306 A | | 10/2015 |
| KR | 20200101680 A | * | 10/2015 |
| KR | 101660790 B1 | | 9/2016 |
| KR | 20170040528 A | | 4/2017 |
| KR | 20190029043 A | | 3/2019 |
| KR | 20200036374 A | | 4/2020 |
| KR | 20210017094 A | | 2/2021 |

OTHER PUBLICATIONS

International Search Report for PCT/KR2022/001919, mailed May 3, 2022, 5 pages.

Written Opinion of the ISA for PCT/KR2022/001919, mailed May 3, 2022, 4 pages.

* cited by examiner

ELECTRONIC DEVICE INCLUDING STYLUS PEN AND OPERATION METHOD THEREFOR

CROSS REFERENCE TO RELATED APPLICATIONS

This application is a continuation of International Application No. PCT/KR2022/001919 filed on Feb. 8, 2022, designating the United States, in the Korean Intellectual Property Receiving Office, and claiming priority to Korean Patent Application No. 10-2021-0033619 filed on Mar. 15, 2021, the disclosures of which are all hereby incorporated by reference herein in their entireties.

BACKGROUND

Field

Various example embodiments relate to an electronic device including a stylus pen and/or an operation method therefor.

Description of Related Art

An electronic device is being developed to receive various inputs from a user through a specified input device (e.g., a stylus pen) connected to the electronic device via wireless communication. The electronic device may determine the position on the electronic device designated by an input device (which can be referred to as a "stylus pen" for convenience in the description herein) with pen functionality, and perform a corresponding function.

The electronic device may determine the position of a stylus pen through interaction with the stylus pen. For example, the electronic device may detect a magnetic field generated by the stylus pen using an electromagnetic resonance (referred to as "EMR") method. The electronic device may confirm the position of the stylus pen based on the induced electromotive force generated by the magnetic field for each channel. Alternatively, the electronic device may be connected to the stylus pen through short-range communication, such as Bluetooth or Bluetooth low energy (BLE). The electronic device may detect the position of the stylus pen based on the electrical signals generated by the stylus pen and receive signals indicating the pressure applied by the stylus pen through short-range communication with the stylus pen.

SUMMARY

Recently, a method of reducing unnecessary elements and promoting efficiency in all stages of product planning/manufacturing/design processes has been attracting attention from the viewpoint of cost reduction and market competitiveness improvement. In addition, the stylus pen needs to satisfy the demands for design differentiation and innovation that can enhance user convenience, rather than simply serving as an input device.

However, a stylus pen that is subordinate to a specific type of electronic device (e.g., a smartphone) cannot be used in other types of electronic devices (e.g., a tablet, a rugged phone, or a laptop). Therefore, there is a need for the stylus pen to be configured to be used in other electronic devices, tailored to the usage environment.

According to example embodiments, an electronic device including a stylus pen and/or an operation method therefor may be provided.

In accordance with an example embodiment, an electronic device may include a stylus pen including a first communication module comprising communication circuitry and a control circuit configured to activate and/or inactivate the first communication module; and a pen housing comprising may include a second communication module comprising communication circuitry and configured for at least a portion of the stylus pen to be arranged therein, wherein the control circuit may be configured to, in response to the at least a portion of the stylus pen being arranged inside the pen housing, inactivate the first communication module and activate the second communication module.

In accordance with an example embodiment, an operation method for an electronic device including a stylus pen may include operating in a first scheme while communicating with a first electronic device via a first communication module of the stylus pen; detecting whether at least a portion of the stylus pen is arranged inside a pen housing of the electronic device including a second communication module; and in response to the at least a portion of the stylus pen being arranged inside the pen housing, inactivating the first communication module and activating the second communication module.

According to various example embodiments, a stylus pen that is subordinate to a specific type of electronic device can be easily used in other types of electronic devices.

According to various example embodiments, a stylus pen can be easily used in other electronic devices based on the coupling state of the stylus pen with a pen housing detachable to the stylus pen, thereby providing compatibility.

Effects obtainable in the present disclosure are not limited to the effects mentioned above, and other effects not mentioned may be clearly understood by those skilled in the art from the description below.

BRIEF DESCRIPTION OF DRAWINGS

The foregoing and other features of example embodiments will become more apparent from the following detailed description of embodiments when read in conjunction with the accompanying drawings. In the drawings, like reference numerals refer to like elements.

In connection with the description of the drawings, the same or similar reference numerals may be used for the same or similar elements.

DETAILED DESCRIPTION

Figure 1:
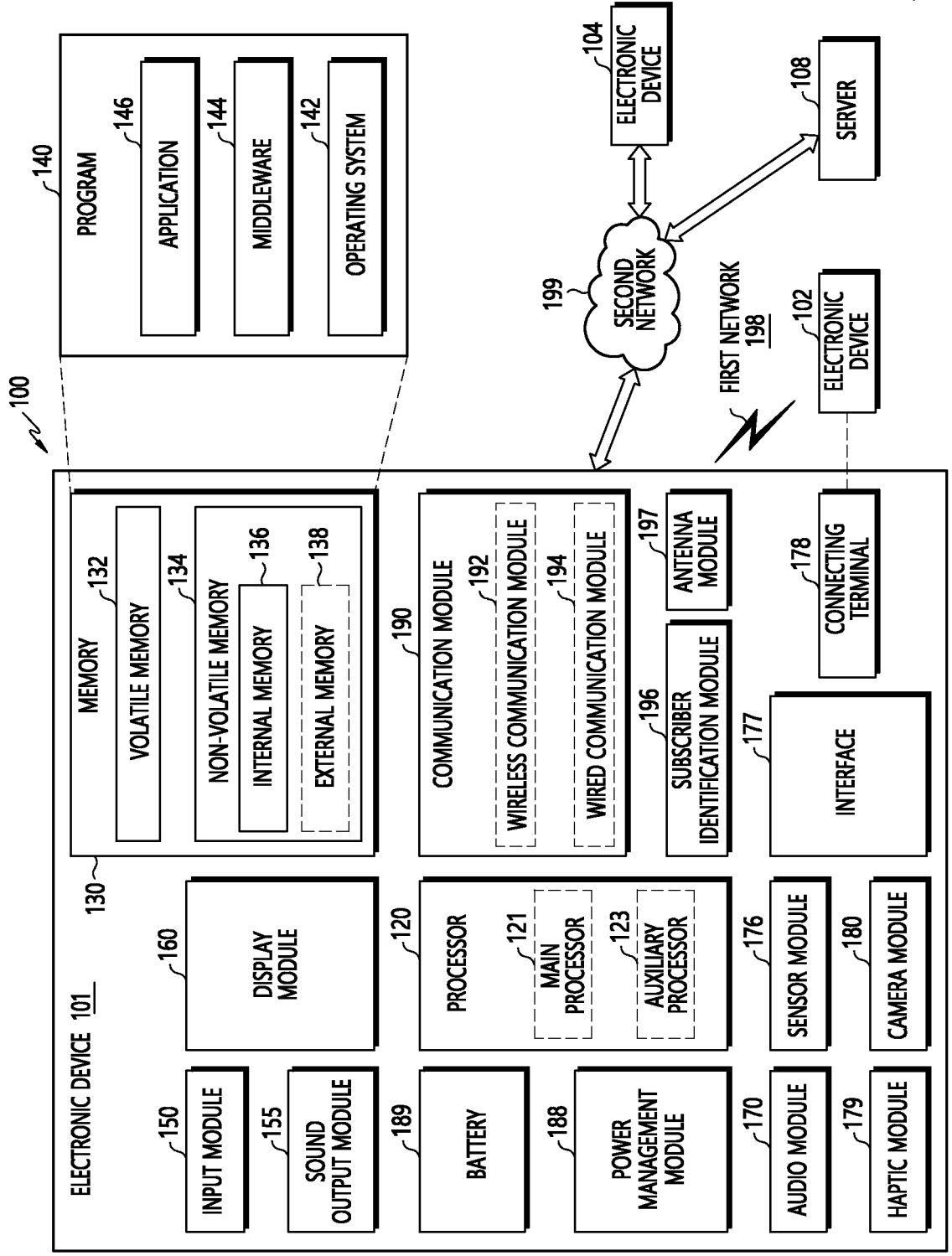
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
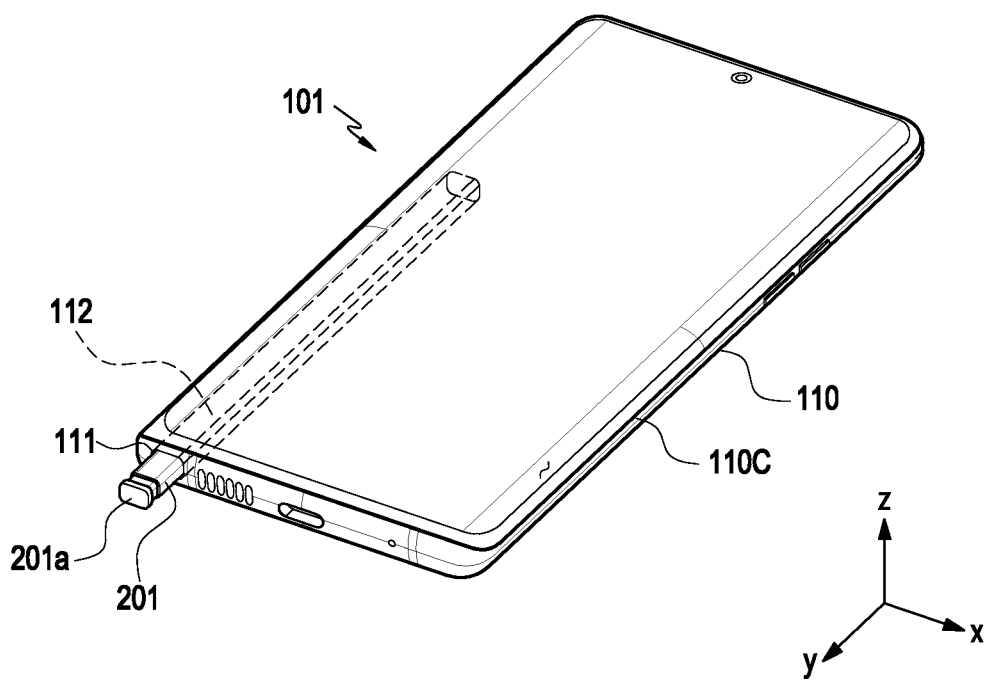
FIG. 2 is a perspective view showing an electronic device including a digital pen according to an example embodiment.

FIG. 2 is a perspective view showing an electronic device including a digital pen according to an embodiment.

Referring to FIG. 2, an electronic device 101 according to an embodiment may include the configuration shown in FIG. 1, and may include a structure into which a digital pen 201 (e.g., a stylus pen) can be inserted. The electronic device 101 may include a housing 110, and include a hole 111 in a portion of the housing, for example, a portion of a side surface 110C. The electronic device 101 may include a storage space 112 connected to the hole 111, and the digital pen 201 may be inserted into the storage space 112. According to the illustrated embodiment, the digital pen 201 may include a depressible button 201a at one end to make it easy to retrieve the digital pen 201 from the storage space 112 of the electronic device 101. When the button 201a is pressed, rebound mechanisms (e.g., at least one spring) that is configured in connection with the button 201a may operate, allowing the digital pen 201 to be detached from the storage space 112.

Although FIG. 2 shows a structure in which the digital pen 201 (e.g., a stylus pen) can be inserted into the electronic device 101, according to an embodiment, the digital pen 201 may be attached to or detached from the surface of the electronic device 101. In this case, the housing of the electronic device 101 may include an area to which the stylus pen 201 can be attached.

Figure 3:
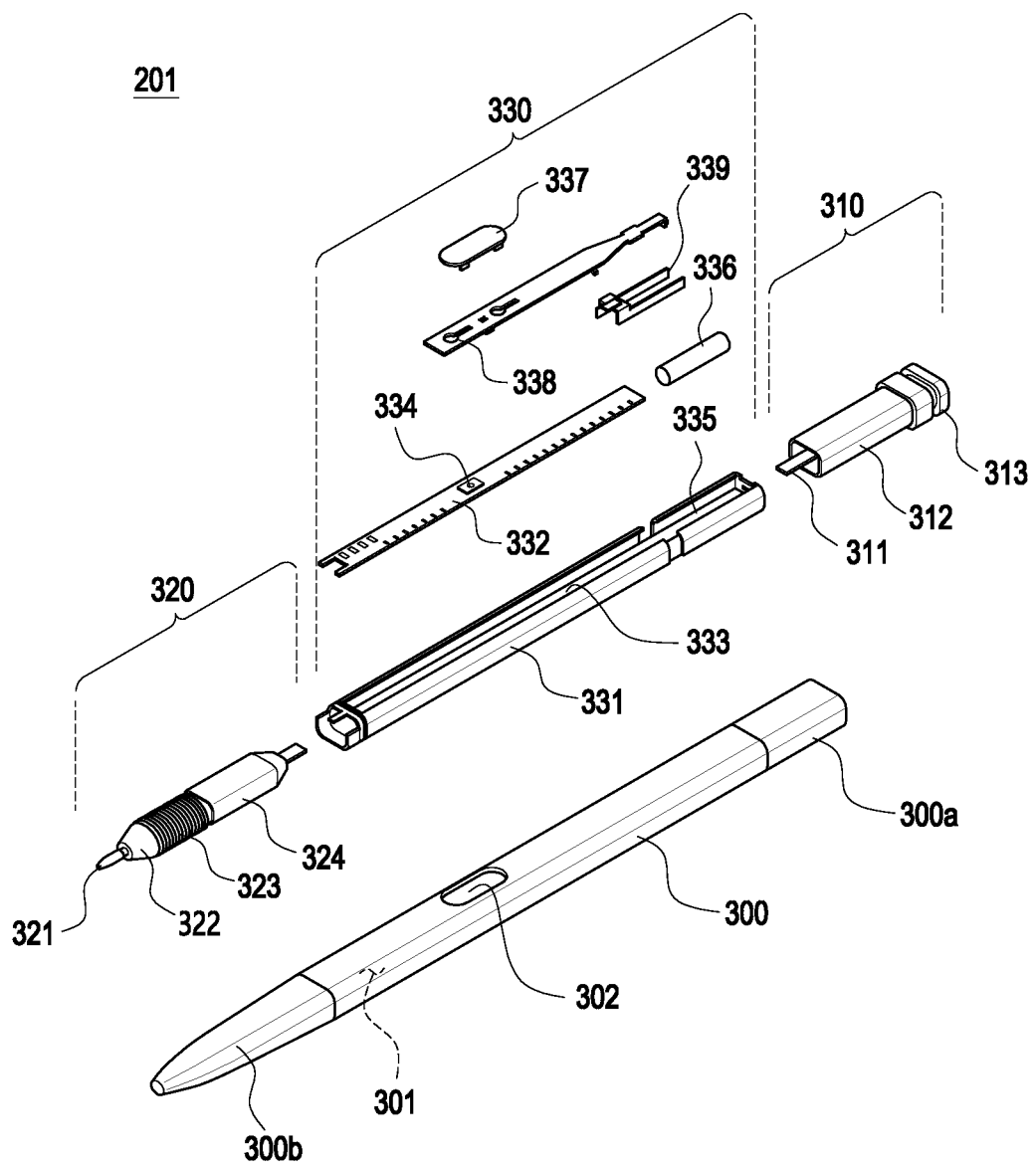
FIG. 3 is an exploded perspective view showing a digital pen according to an example embodiment.

FIG. 3 is an exploded perspective view showing a digital pen according to an embodiment.

Referring to FIG. 3, the digital pen 201 may include a pen housing 300 constituting an external shape of the digital pen 201 and an inner assembly provided inside the pen housing 300. In the illustrated embodiment, the inner assembly, including all of various components mounted inside the pen, may be inserted into the pen housing 300 with a single assembly operation.

The pen housing 300 may have a shape that is elongated between a first end 300a and a second end 300b, and may include a storage space 301 therein. The pen housing 300 may have an elliptical cross-section having a long axis and a short axis, and may be formed overall in the shape of an elliptical cylinder. The storage space 301 of the electronic device 101 may also have an elliptical cross-section corresponding to the shape of the pen housing 300. The pen housing 300 may include a synthetic resin (e.g., plastic) and/or a metallic material (e.g., aluminum). According to an embodiment, the second end 300b of the pen housing 300 may be made of a synthetic resin material.

The inner assembly may have an elongated shape corresponding to the shape of the pen housing 300. The inner assembly may be largely divided into three components along the longitudinal direction. For example, the inner assembly may include an ejection member 310 arranged at a position corresponding to the first end 300a of the pen housing 300, a coil unit 320 arranged at a position corresponding to the second end 300b, and a circuit board unit 330 arranged at a position corresponding to the body of the housing.

The ejection member 310 may include a component for extracting the digital pen 201 from the storage space 112 of the electronic device 101. According to an embodiment, the ejection member 310 may include a shaft 311, an ejection body 312 arranged around the shaft 311 and constituting the overall outer appearance of the ejection member 310, and a button unit 313. When the inner assembly is completely inserted into the pen housing 300, a portion including the shaft 311 and the ejection body 312 may be surrounded by the first end 300a of the pen housing 300, and the button unit 313 (e.g., 201a in FIG. 2) may be exposed to the outside of the first end 300a. Inside the ejection body 312, a plurality of components which are not shown, for example, cam members or elastic members may be arranged to form a push-pull structure. In an embodiment, the button unit 313 may be substantially coupled, directly or indirectly, to the shaft 311 to perform a linear reciprocating motion with respect to the ejection body 312. According to various embodiments, the button unit 313 may include a button having a hooking structure that allows the user to remove the digital pen 201 using a fingernail. According to an embodiment, the digital pen 201 may provide another input method by including a sensor for detecting a linear reciprocating motion of the shaft 311.

The coil unit 320 may include a pen tip 321 exposed to the outside of the second end 300b when the inner assembly is fully inserted into the pen housing 300, a packing ring 322, a multi-wound coil 323, and/or a pressure sensing unit 324 for acquiring a change in pressure due to the pressure of the pen tip 321. The packing ring 322 may include epoxy, rubber, urethane, or silicon. The packing ring 322 may be equipped for waterproofing and dustproofing purposes to protect the coil unit 320 and the circuit board unit 330 from water immersion or dust. In an embodiment, the coil 323 may form a resonant frequency at a predetermined frequency band (e.g. 500 kHz) and may be combined with at least one component (e.g. a capacitor) to adjust the resonant frequency formed by the coil 323 within a certain range.

The circuit board unit 330 may include a printed circuit board 332, a base 331 surrounding at least one surface of the printed circuit board 332, and an antenna. According to an embodiment, on an upper surface of the base 331, a substrate seated portion 333 on which the printed circuit board 332 is arranged may be provided, and the printed circuit board 332 may be fixed in a state of being seated on the substrate seated portion 333. According to an embodiment, the printed circuit board 332 may include an upper surface and a lower surface, a variable capacitance capacitor or switch 334 connected, directly or indirectly, to the coil 323 may be arranged on the upper surface, and a charging circuit (e.g., a charging circuit 288 of FIG. 3), a battery (e.g., a battery 289 of FIG. 3), or a communication circuit (e.g., communication circuit 290 of FIG. 3) may be arranged on the lower surface. The battery may include an electric double layered capacitor (EDLC). The charging circuit may be located between the coil 323 and the battery and may include voltage detector circuitry and a rectifier.

The antenna may include an antenna structure 339 and/or an antenna embedded in the printed circuit board 332, as illustrated in the example shown in FIG. 3. Various embodiments, the switch 334 may be provided on the printed circuit board 332. A side button 337 provided on the digital pen 201 may be used to press the switch 334 and may be exposed to the outside through a side opening 302 of the pen housing 300. The side button 337 may be supported by a support member 338, and when there is no external force acting on the side button 337, the support member 338 may provide an elastic restoring force to restore or maintain the side button 337 while the side button 337 is disposed in a predetermined position.

The circuit board unit 330 may include other packing rings such as O-rings. For example, O-rings made of an elastic material may be arranged at both ends of the base 331 to form a sealing structure between the base 331 and the pen housing 300. In some embodiments, the support member 338 may be partially brought into contact with the inner wall of the pen housing 300 around the side opening 302 to form a sealing structure. For example, the circuit board unit 330 may also form a waterproof and dustproof structure similar to that of the packing ring 322 of the coil unit 320.

The digital pen 201 may include a battery seated portion 335 in which a battery 336 is disposed on an upper surface of the base 331. The battery 336 that is mounted on the battery seated portion 335 may include, for example, a cylinder type battery.

The digital pen 201 may include a microphone (not shown). The microphone may be directly connected to the printed circuit board 332 or may be connected to a separate flexible printed circuit board (FPCB) (not shown) connected to the printed circuit board 332. In various embodiments, the microphone may be arranged parallel to the side button 337 in the longitudinal direction of the digital pen 201.

According to various embodiments, when the digital pen 201 can be attached to or detached from the surface of the electronic device 101, the digital pen 201 does not include the ejection member 310 and may include at least one magnetic material to be attached to the surface of the electronic device 101. The digital pen 201 may be attached to various positions of the housing of the electronic device 101 through the at least one magnetic material. In addition, according to various embodiments, the digital pen 201 may not include the side button 337 and the support member 338, and in this case, there may be no opening 302 on the side surface of the pen housing 300.

Hereinafter, the configuration of the input device 401 excluding the electronic device 101 will be described in detail. Although the input device 401 is included in the scope of the electronic device, it should be noted that it is commonly referred to as an input device for convenience of description.

Figure 4:
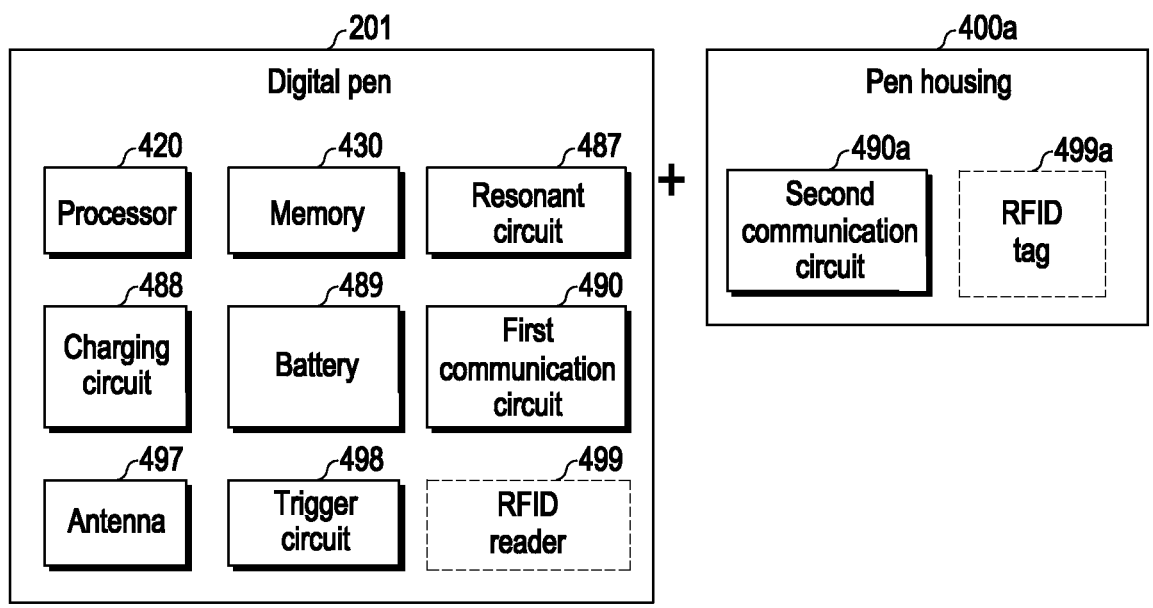
FIG. 4 is a block diagram illustrating an input device according to various example embodiments.

FIG. 4 is a block diagram illustrating an input device according to various embodiments. According to an embodiment, the digital pen 201 coupled, directly or indirectly, to a pen housing 400a may be referred to as an electronic device (hereinafter, referred to as an input device) 401. In addition, the pen housing 400a detachable from or coupled, directly or indirectly, to the digital pen 201 may be referred to as an accessory device.

Referring to FIG. 4, the input device 401 according to an embodiment may largely include the digital pen 201 and the pen housing 400a. According to various embodiments, to allow the digital pen 201 that is subordinate to a specific type of electronic device (e.g., the electronic device 101 of FIG. 1) to be used in other electronic devices (e.g., the external electronic device 104 of FIG. 1), the pen housing 400a that can be coupled, directly or indirectly, to the digital pen 201 may be provided. According to various embodiments, the digital pen 201 may be paired with other electronic devices other than the subordinate electronic device based on the coupled state of the digital pen 201 with the pen housing 400a attachable to or detachable from the digital pen 201. Here, the electronic device 101 to which the digital pen 201 is subordinate may be referred to as a main device, and another electronic device 104 that is temporarily paired may be referred to as a sub-device.

The pen housing 400a according to an embodiment may have a structure capable of being coupled, directly or indirectly, to the digital pen 201 and may include a second communication circuit 490a.

The digital pen 201 according to an embodiment may include a processor 420, a memory 430, a resonant circuit 487, a charging circuit 488, a battery 489, a first communication circuit 490, an antenna 497, and/or a trigger circuit 498. In some embodiments, the processor 420 of the digital pen 201, at least a portion of the resonant circuit 487, and/or at least a portion of the first communication circuit 490 may be configured on a printed circuit board or in chip form. The processor 420, the resonant circuit 487, and/or the first communication circuit 490 may be electrically connected, directly or indirectly, to the memory 430, the charging circuit 488, the battery 489, the antenna 497, or the trigger circuit 498. The digital pen 201 according to an embodiment may include only the resonant circuit 487 and a button.

The processor 420, comprising processing circuitry, may include a generic processor configured to execute a customized hardware module or software (e.g., an application program). According to an embodiment, the processor 420 may be referred to as a control circuit. The processor 420 may include hardware components (functions) including at least one of various sensors provided in the digital pen 201, a data measurement module, an input/output interface, a module for managing a state or environment of the digital pen 201, or a communication module, or software components (programs). The processor 420 may include, for example, one of hardware, software, or firmware, or a combination of two or more thereof. According to an embodiment, the processor 420 may receive a proximity signal corresponding to an electromagnetic field signal generated from a digitizer (not shown) of the electronic device 101 through the resonant circuit 487. When the proximity signal is confirmed, the resonant circuit 487 may be controlled to transmit an electromagnetic resonance (EMR) input signal to the electronic device 101.

The memory 430 may store information related to the operation of the digital pen 201. For example, the information may include information for communication with the electronic device 101 and frequency information related to an input operation of the digital pen 201.

The resonant circuit 487 may include at least one of a coil, an inductor, or a capacitor. The resonant circuit 487 may be used for the digital pen 201 to generate a signal including a resonant frequency. For example, to generate the signal, the digital pen 201 may use at least one of an electro-magnetic resonance (EMR) scheme, an active electrostatic (AES) scheme, or an electrically coupled resonance (ECR) scheme.

When the digital pen 201 transmits a signal by the EMR scheme, the digital pen 201 may generate a signal including a resonant frequency based on an electromagnetic field generated from an inductive panel of the electronic device 101. When the digital pen 201 transmits a signal using the AES scheme, the digital pen 201 may generate a signal using capacitive coupling with the electronic device 101. In this case, the electronic device 101 may confirm a touch position of the digital pen 201 based on a position where the signal generated by the digital pen 201 is detected. When the digital pen 201 transmits a signal using the ECR scheme, the digital pen 201 may generate a signal including a resonant frequency based on an electric field generated from a capacitive device of the electronic device. According to an embodiment, the resonant circuit 487 may be used to change the strength or frequency of the electromagnetic field according to a user's manipulation state. For example, the resonant circuit 487 may provide a frequency for recognizing a hovering input, a drawing input, a button input, or an erasing input.

When the charging circuit 488 is connected, directly or indirectly, to the resonant circuit 487 based on a switching circuit, a resonance signal generated in the resonant circuit 487 may be rectified into a DC signal to be provided to the battery 489. According to an embodiment, the digital pen 201 may confirm whether the digital pen 201 is inserted into the electronic device 101 using a voltage level of the DC signal detected by the charging circuit 488.

The battery 489 may be configured to store power required for the operation of the digital pen 201. The battery may include, for example, a lithium-ion battery or a capacitor, and may be rechargeable or replaceable. According to an embodiment, the battery 489 may be charged using power (e.g., DC signal {DC power}) provided from the charging circuit 488.

The first communication circuit 490 may be configured to perform a wireless communication function between the digital pen 201 and the communication module 190, comprising communication circuitry, of the electronic device 101. According to an embodiment, the first communication circuit 490 may transmit state information and input information of the digital pen 201 to the electronic device 101 using a short-range communication scheme. For example, the first communication circuit 490 may transmit, to the electronic device 101, direction information (e.g., motion sensor data) of the digital pen 201 acquired through the trigger circuit 498, voice information input through the microphone, or remaining amount information of the battery 489. For example, the first communication circuit 490 may transmit a signal representing the pen pressure obtained through a pen pressure detector (not shown) to the electronic device 101. For example, the short-range communication scheme may include at least one of Bluetooth, Bluetooth low energy (BLE), and wireless LAN.

The antenna 497 may be used to transmit or receive signals or power to or from the outside (e.g., the electronic device 101). According to an embodiment, the digital pen 201 may include a plurality of antennas 497, and among them, at least one antenna 497 suitable for a communication scheme may be selected. Through the selected at least one antenna 497, the first communication circuit 490 may exchange signals or power with an external electronic device.

The trigger circuit 498 may include at least one button or sensor circuit. According to an embodiment, the processor 420 may confirm an input method (e.g., touched or pressed) or type (e.g., EMR button or BLE button) of the button of the digital pen 201.

According to an embodiment, the digital pen 201 may further include a sensor circuit (not shown). The sensor circuit may generate an electrical signal or data value corresponding to an internal operating state of the digital pen 201 or an external environmental state. For example, the sensor circuit may include at least one of a motion sensor, a battery level detection sensor, a pressure sensor, a light sensor, a temperature sensor, a geomagnetic sensor, and a biosensor. According to an embodiment, the trigger circuit 498 may transmit a trigger signal to the electronic device 101 using an input signal of the button or a signal through the sensor.

According to an embodiment, the digital pen 201 as a device that supports Bluetooth communication may be a device that is subordinate to the electronic device 101, and may be temporarily used in another electronic device 104 when coupled to the pen housing 400a. For example, the digital pen 201 coupled, directly or indirectly, to the pen housing 400a may be referred to the input device 401, and the pen housing 400a may be configured to allow at least a portion of the digital pen 201 to be disposed therein. According to an embodiment, the pen housing 400a may be coupled to the digital pen 201 through a coupling member.

According to an embodiment, the processor 420 may detect the coupling of the digital pen 201 with the pen housing 400a when the at least a portion of the digital pen 201 is disposed inside the pen housing 400a. For example, the processor 420 may detect the coupling of the digital pen 201 with the pen housing 400a using a switch. According to an embodiment, when a depressible button (e.g., the button 201a of FIGS. 2 and 3) provided at one end (e.g., a first end 300a of FIG. 3) of the digital pen 201 is pressed by the coupling of the digital pen 201 with the pen housing 400a, the switch may output a signal obtained by detecting whether the digital pen 201 is coupled to the pen housing 400a by pressing the button to the processor 420. According to an embodiment, the processor 420 may be electrically connected, directly or indirectly, to a second communication circuit 490a within the pen housing 400a when the digital pen 201 is coupled to the pen housing 400a.

According to an embodiment, in response to the detection of the coupling of the digital pen 201 with the pen housing 400a, the processor 420 may control to inactivate the first communication circuit 490 and activate the second communication circuit 490a inside the pen housing 400a. For example, the processor 420 may search for another electronic device 104 in response to the detection of the coupling of the digital pen 201 with the pen housing 400a. According to an embodiment, the processor 420 may search for another electronic device 104 in response to reception of a search request for the other electronic device 104 from a user. For example, when an icon configured to search for the other connectable electronic device 104 is selected by a user on a setting screen related to a Bluetooth communication connection of the electronic device 101, the processor 420 may search for the other electronic device 104.

According to an embodiment, when the processor 420 is paired with the electronic device 101 through the first communication circuit 490, the processor 420 may cancel the pairing with the electronic device 101, and may search for the other electronic device 104 in a short-range wireless communication scheme through the second communication circuit 490a. For example, the operation of searching for the other electronic device 104 based on a BLE protocol may include an operation of broadcasting a message including identification information related to the pen housing 400a. Here, the identification information related to the pen housing 400a may be unique information of an accessary device (or an additional module {e.g., outer piece}) coupled to the digital pen 201. According to an embodiment, the identification information related to the pen housing 400a may be provided to the processor 420 using a radio frequency identification (RFID) scheme, but the method of providing the identification information is not limited thereto.

For example, the pen housing 400a may include an RFID tag 499a on which predetermined identification information is recorded, and the digital pen 201 may further include an RFID reader 499 that reads the identification information recorded on the RFID tag 499a.

According to an embodiment, the processor 420 may acquire identification information of the RFID tag 499a by operating the RFID reader 499 in response to detection of the coupling of the digital pen 201 with the pen housing 400a. The processor 420 may determine whether the acquired (or read) identification information of the RFID tag 499a matches identification information stored in the memory 430. When they match each other, the processor 420 may be switched to a mode in which a pen operation using the pen housing 400a is possible.

For example, when the identification information of the RFID tag 499a matches the identification information stored in the memory 430, the processor 420 may authenticate that the pen housing 400a is an accessory device that can be coupled, directly or indirectly, to the digital pen 201. Accordingly, when the authentication is successful, the processor 420 may inactivate the first communication circuit 490 and activate the second communication circuit 490a in the pen housing 400a to initiate the operation of searching for the other electronic device 104. Meanwhile, when the identification information of the RFID tag 499a does not match the identification information stored in the memory 430, even if the pen housing 400a is coupled to the digital pen 201, the operation may be terminated by considering that the corresponding pen housing is not an authorized pen housing 400a. For example, when the corresponding pen housing is not the authorized pen housing 400a, the processor 420 may maintain pairing with the electronic device 101 through the first communication circuit 490.

According to an embodiment, the processor 420 may operate in a first scheme while pairing with the electronic device 101 through the first communication circuit 490 is maintained. For example, the processor 420 may transmit a signal to the electronic device 101 by the first scheme. In addition, according to an embodiment, when the first communication circuit 490 is inactivated, the processor 420 may communicate with the other electronic device 104 through the second communication circuit 490a to control the other electronic device 104 to operate in the first scheme or the second scheme. The first scheme or the second scheme may be at least one of an electro-magnetic resonance (EMR) scheme, an active electrostatic (AES) scheme, or an electrically coupled resonance (ECR) scheme.

For example, the processor 420 may transmit a signal to the electronic device 101 in the first scheme before coupling of the digital pen 201 with the pen housing 400a, and may transmit a signal to the other electronic device 104 in the same scheme as the searched other electronic device 104 after coupling of the digital pen 201 with the pen housing 400a, that is, in the first scheme, but the processor 420 may transmit a signal to the other electronic device 104 in the second scheme different from the first scheme. For example, while the digital pen 201 operates with the electronic device 101 by the EMR scheme, the input device 401 in a state in which the pen housing 400a is coupled to the digital pen 201 may interoperate with the other electronic device 104 through the EMR scheme, and in this scheme, the input device 401 may interoperate with another third electronic device, thereby enhancing compatibility. In addition, while the digital pen 201 operates with the electronic device 101 by the EMR scheme, the input device 401 in a state in which the pen housing 400a is coupled to the digital pen 201 may interoperate with the other electronic device 104 in the AES scheme, and may interoperate with another third electronic device through the AES scheme. In addition, while the digital pen 201 operates with the electronic device 101 by the AES scheme, the input device 401 in a state in which the pen housing 400a is coupled to the digital pen 201 may interoperate with the other electronic device 104 in the AES scheme, and may interoperate with another third electronic device through the AES scheme. According to various embodiments, the digital pen 201 may be coupled to the pen housing 400a without being subordinate to a specific type of electronic device to interoperate with another electronic device, so that the digital pen 201 may be easily used in various types of electronic devices.

According to various embodiments, an electronic device (e.g., the input device 401) may include a stylus pen (e.g., the digital pen 201) including a first communication module (e.g., the first communication module 490, comprising communication circuitry) and a control circuit (e.g., the processor 420) configured to activate or inactivate the first communication module; and a pen housing (e.g., the pen housing 400a) comprising a second communication module (e.g., the second communication module 490a, comprising communication circuitry) and configured for at least a portion of the stylus pen to be arranged therein, wherein the control circuit may be configured to, in response to the at least a portion of the stylus pen being arranged inside the pen housing, inactivate the first communication module and activate the second communication module.

According to various embodiments, the control circuit may be configured to operate in a first scheme by communicating with a first electronic device via the first communication module, and may operate in the first scheme or a second scheme by communicating with a second electronic device via the second communication module when the first communication module is inactivated.

According to various embodiments, the first communication module and the second communication module are configured to operate based on Bluetooth low energy (BLE).

According to various embodiments, the first scheme or the second scheme may be at least one of an EMR scheme, an AES scheme, or an ECR scheme.

According to various embodiments, the pen housing may include a structure that is attached to or detachable from the stylus pen.

According to various embodiments, the pen housing may include a first pen housing into which a first portion of the stylus pen is inserted, and a second pen housing into which a second portion of the stylus pen is inserted and which is coupled to the first pen housing.

According to various embodiments, the second pen housing may be coupled, directly or indirectly, to the first pen housing including a storage space in which the second communication module is arranged and the first portion of the stylus pen is accommodated therein, through a coupling member.

According to various embodiments, the pen housing may include a radio frequency identification (RFID) tag on which predetermined identification information is recorded, and the stylus pen may include an RFID reader configured to read the identification information recorded on the RFID tag.

According to various embodiments, the control circuit may be configured to authenticate the pen housing based on the identification information read by the RFID reader in response to the at least a portion of the stylus pen being arranged inside the pen housing.

According to various embodiments, the stylus pen may include a switch configured to detect, when a depressible button provided at one end of the stylus pen is pressed by coupling of the stylus pen with the pen housing, whether the stylus pen is coupled to the pen housing by the depressible button being pressed.

According to various embodiments, in a case in which the at least a portion of the stylus pen is arranged inside the pen housing, the control circuit may be configured to inactivate the first communication module and activate the second communication module when the coupling of the stylus pen with the pen housing is detected using the switch.

Figure 5A:
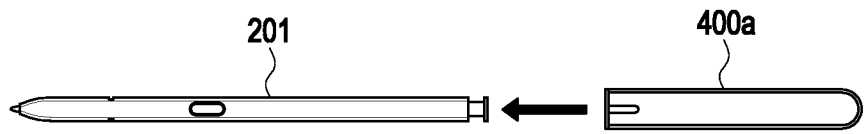
FIG. 5A is an exemplary diagram illustrating an input device according to various example embodiments.

FIG. 5A is an exemplary diagram illustrating an input device according to various embodiments.

Referring to FIG. 5A, an input device 401 according to an embodiment may have a structure in which the pen housing 400a is coupled, directly or indirectly, to the digital pen 201 (e.g., a stylus pen). The digital pen 201 according to an embodiment may include the components of the digital pen 201 of FIG. 3 and may be the digital pen 201 described above with reference to FIG. 4.

As shown in FIG. 5A, the pen housing 400a may be coupled, directly or indirectly, to one end (e.g., the first end 300a of FIG. 3) of the digital pen 201. According to an embodiment, the pen housing 400a may include a coupling member coupled to one end of the digital pen 201. For example, the coupling member may be provided to surround one end of the digital pen 201. In addition, the input device 401 according to an embodiment may include a screw-open and locking structure so that the pen housing 400a may be coupled to the digital pen 201. In addition, the input device 401 according to an embodiment may configure a direction in which the pen housing 400a is coupled to the digital pen 201 by including an alignment key structure. In this way, the structure in which the digital pen 201 and the pen housing 400a are coupled, directly or indirectly, to each other may be designed in various shapes and positions.

Figure 5B:
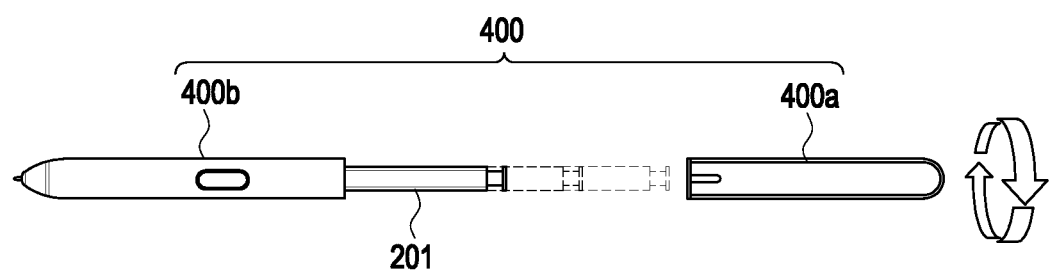
FIG. 5B is another exemplary diagram illustrating an input device according to various example embodiments.

FIG. 5B is another exemplary diagram illustrating an input device according to various embodiments.

Referring to FIG. 5B, the input device 401 may include a housing 400 constituting an external shape of the input device 401 and an inner assembly surrounded by the housing 400. According to an embodiment, the inner assembly may be inserted into the housing 400, and the digital pen 201 may be accommodated in the housing 400. In this way, the housing 400 constituting the external shape of the input device 401 may include a first pen housing 400b and a second pen housing 400a. Here, the second pen housing 400a may include the same configuration as the pen housing 400a of FIGS. 4 and 5A and may be the pen housing 400a described above with reference to FIG. 4.

As shown in FIG. 5B, the first portion of the digital pen 201 may be inserted into the first pen housing 400b, the second portion of the digital pen 201 may be inserted into the second pen housing 400a, and the second pen housing 400a may be coupled, directly or indirectly, to the first pen housing 400b. According to an embodiment, most of the digital pen 201 may be accommodated in the first pen housing 400b, and only a portion of the digital pen 201 may be accommodated in the second pen housing 400a. According to another embodiment, the first pen housing 400b may include an internal space in which the entire digital pen 201 may be accommodated.

According to an embodiment, in the second pen housing 400a, various types of electronic components and circuit components including a second communication module (e.g., the second communication circuit 490a of FIG. 4) for pairing with another electronic device 104 other than the subordinate electronic device 101 may be provided. On the other hand, the first pen housing 400b may have a hollow structure.

As shown in FIG. 5B, the housing 400 constituting the external shape of the input device 401 may have a shape that is elongated and thin as a whole while accommodating the digital pen 201. For example, the housing 400 may include an internal space in which the digital pen 201 can be accommodated in the first pen housing 400b.

Referring to FIG. 5B, as the digital pen 201 is inserted into the housing 400 of the input device 401, the input device 401 may disconnect communication with the electronic device 101 and initiate communication with another electronic device 104. For example, by inserting the digital pen 201 into the housing 400 of the input device 401, the user may use the input device as is in the electronic device 104 other than the electronic device 101 being used.

Figure 5C:
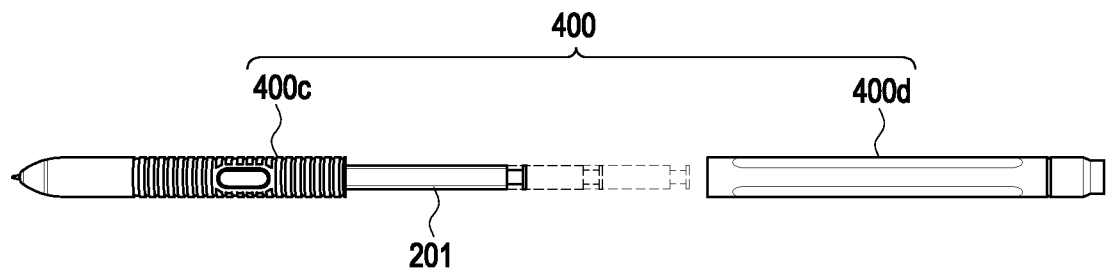
FIG. 5C is a still another exemplary diagram illustrating an input device according to various example embodiments.

FIG. 5C is a still another exemplary diagram illustrating an input device according to various embodiments.

Referring to FIG. 5C, the input device 401 may include the housing 400 constituting an external shape of the input device 401 and an inner assembly surrounded by the housing 400. As shown in FIG. 5B, the housing 400 constituting the external shape of the input device 401 may include a first pen housing 400c and a second pen housing 400d. Here, the second pen housing 400d may include the same components as the pen housing 400a of FIGS. 4 and 5A and may be the pen housing 400a described above with reference to FIG. 4.

Referring to FIG. 5C, as the digital pen 201 is inserted into the housing 400 of the input device 401, the input device 401 may disconnect communication with the electronic device 101 and may initiate communication with a third electronic device. According to an embodiment, when the housing 400 of the input device 401 may include the first pen housing 400b and the second pen housing 400a as shown in FIG. the input device 401 may communicate with another electronic device 104, and when the housing 400 includes the first pen housing 400c and the second pen housing 400d as shown in FIG. 5C, the input device 401 may communicate with a third electronic device.

According to the various embodiments shown in FIGS. 5B and 5C, the housing 400 of the input device 401 into which the digital pen 201 is inserted may be provided in various ways, thereby providing a user of the input device with the same grip feeling as the pen used in the type of the corresponding electronic device. In this way, when the housing 400 of the input device 401 is provided to surround the entire digital pen 201, the grip feeling of the user can be improved.

Figure 6:
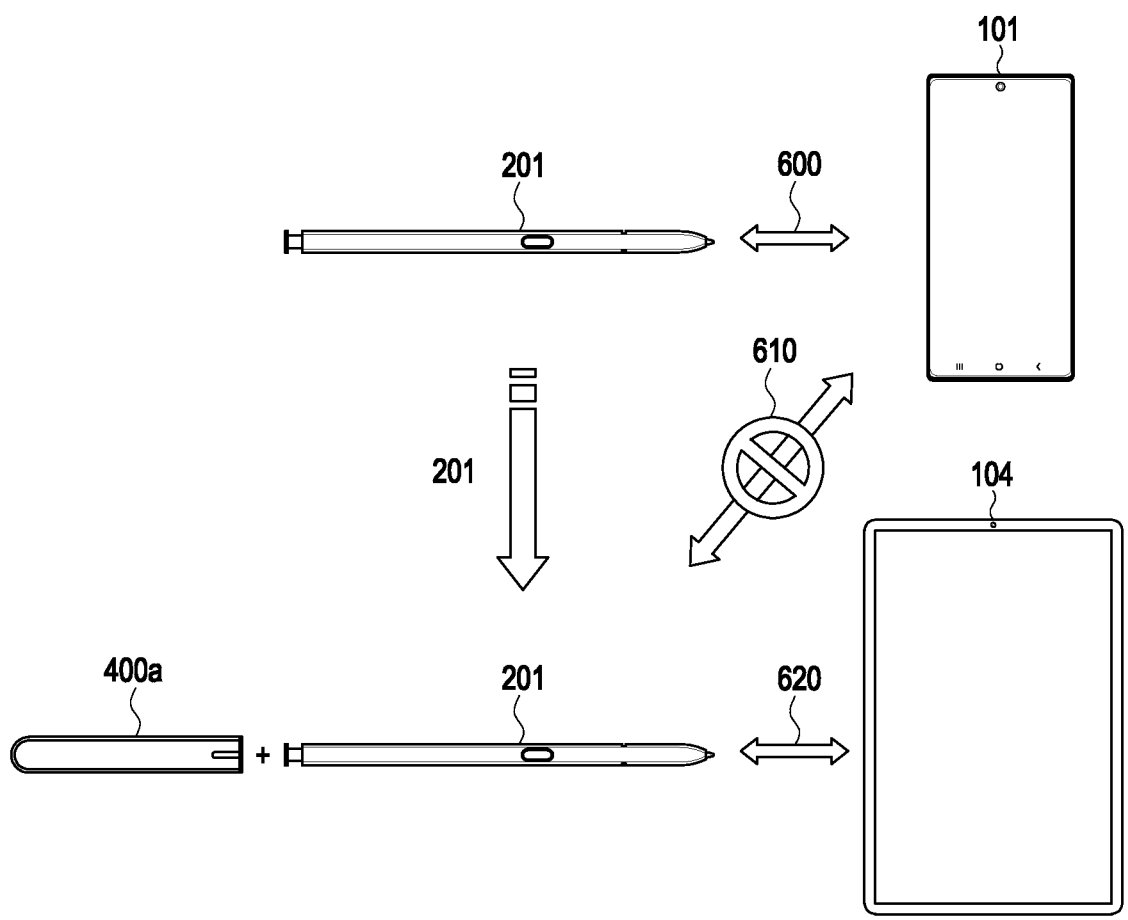
FIG. 6 is an exemplary diagram illustrating a case in which an input device is used based on a coupling state with a pen housing between a first electronic device and a second electronic device according to various example embodiments.

FIG. 6 is an exemplary diagram illustrating a case in which an input device is used based on a coupling state with a pen housing between a first electronic device and a second electronic device according to various embodiments. Hereinafter, the electronic device 101 may be referred to as a first electronic device, and another electronic device 104 may be referred to as a second electronic device.

Referring to FIG. 6, the digital pen 201 may be a device that is subordinate to the first electronic device 101 through short-range communication. Here, the digital pen 201 may be inserted into the first electronic device 101 or attached to or detached from the surface of the first electronic device 101, and is referred to as a device subordinate to the first electronic device 101. For example, when the digital pen 201 is paired with the first electronic device 101 in 600, the user can use the digital pen 201 on the first electronic device 101.

Thereafter, the user may couple the pen housing 400a to the digital pen 201 in order to use the digital pen 201 in the second electronic device 104 as well. Although the pen housing 400a is shown as the pen housing 400a of FIG. 5A in FIG. 6, it should be noted that the pen housing 400a may refer to the housing 400 of the input device 401 in FIGS. 5B and 5C.

As shown in FIG. 6, when the pen housing 400a is coupled to the digital pen 201, the input device 401 may cancel paring with the first electronic device 101 in 610 in response to the coupling with the pen housing 400a, and may be paired with the second electronic device 104 in 620. When the pairing is completed, the user may use the pen functionality that can be supported by the second electronic device 104 using the input device 401.

Figure 7:
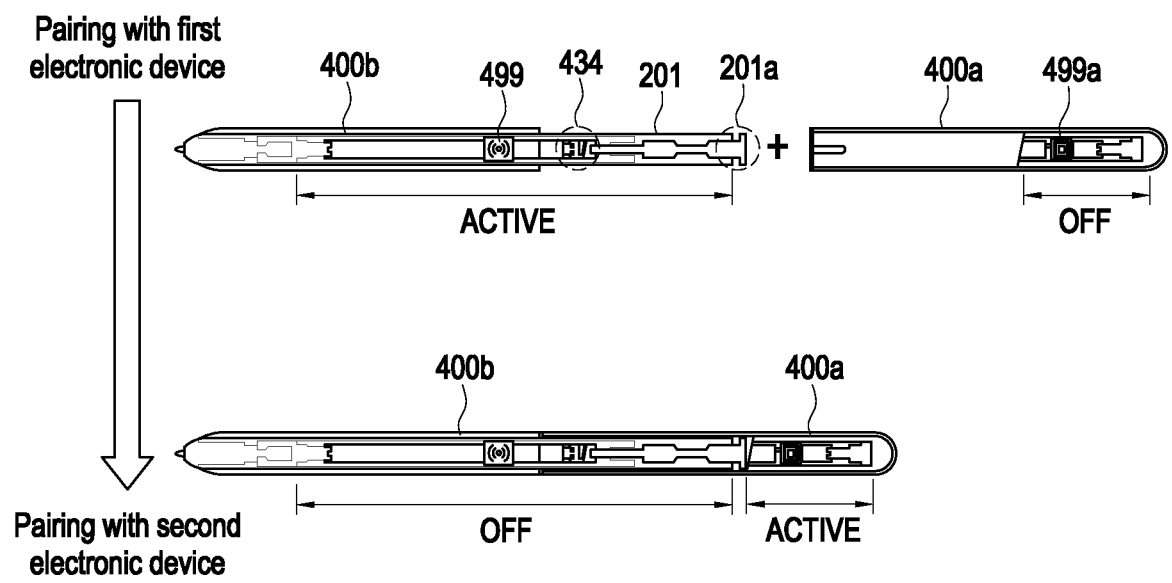
FIG. 7 is a diagram illustrating an internal structure of an input device according to various example embodiments.

FIG. 7 is a diagram illustrating an internal structure of an input device according to various embodiments.

In FIG. 7, as shown in FIGS. 5B and 5C, structures before and after the digital pen 201 is inserted into the housing of the input device 401 including the first pen housing 400b and the second pen housing 400a are illustrated.

As shown in FIG. 7, when at least a portion of the digital pen 201 is inserted into the first pen housing 400b but the first pen housing 400b is separated from the second pen housing 400a, the input device 401 may be in a pairing state with the first electronic device 101. On the other hand, when the first pen housing 400b is coupled to (or engaged with), directly or indirectly, the second pen housing 400a, the input device 401 may search for the second electronic device 104 other than the first electronic device 101 to be paired with the second electronic device 104. Accordingly, the stylus pen subordinate to a specific type of electronic device may be easily used in another type of electronic device.

According to various embodiments, the digital pen 201 may include a switch 434 that is pressed by a button 201a (e.g., the button 201a of FIG. 3). The switch 434 may be configured to change the pressure by the button 201a into an electrical signal. The switch 434 may be located in an inner space within one end of the digital pen 201 (e.g., the first end 300a of FIG. 3). When the button 201a is pressed by the coupling of the digital pen 201 with the second pen housing 400a, the switch 434 may output a signal obtained by detecting whether the digital pen 201 is coupled to the second pen housing 400a by the button 201a being pressed, to a processor (e.g., the processor 420 of FIG. 4).

According to various embodiments, an RFID reader 499a (e.g., the RFID reader 499a of FIG. 4) may be arranged on a circuit board unit (e.g., the circuit board unit 330 of FIG. 3) of the digital pen 201. In addition to this, a first communication circuit (e.g., the first communication circuit 490 of FIG. 4) may also be arranged on the circuit board within the digital pen 201.

According to various embodiments, in the inner assembly of the second pen housing 400a, the RFID tag 499a (e.g., the RFID tag 499a in FIG. 4) having predetermined identification information recorded thereon and a second communication circuit (e.g., the second communication circuit 490a in FIG. 4) may be arranged.

As shown in FIG. 7, when the first pen housing 400b is separated from the second pen housing 400a, the first communication circuit of the input device 401 may be in an active state, but the second communication circuit may be in an inactive state (or off). That is, during pairing with the first electronic device 101, only the first communication circuit may be in the active state.

On the other hand, in response to the first pen housing 400b being coupled to, directly or indirectly, the second pen housing 400a, a signal obtained by detecting whether the first pen housing 400b is coupled to the second pen housing 400a due to the button 201a being pressed may be output through the switch 434.

According to an embodiment, the input device 401 may acquire identification information of the RFID tag 499a by operating the RFID reader 499 in response to the detection of the coupling. The input device 401 may determine whether the acquired (or read) identification information of the RFID tag 499a matches previously stored identification information. When they match, the input device 401 may start to search for the second electronic device 104, may be paired with the second electronic device 104, and may be switched to a mode in which a pen operation in the second electronic device 104 is possible. As shown in FIG. 7, when the first pen housing 400b is in the coupled state with the second pen housing 400a, the first communication circuit of the input device 401 may be inactivated and the second communication circuit may be activated. That is, during pairing with the second electronic device 101, only the second communication circuit may be in the active state.

Figure 8:
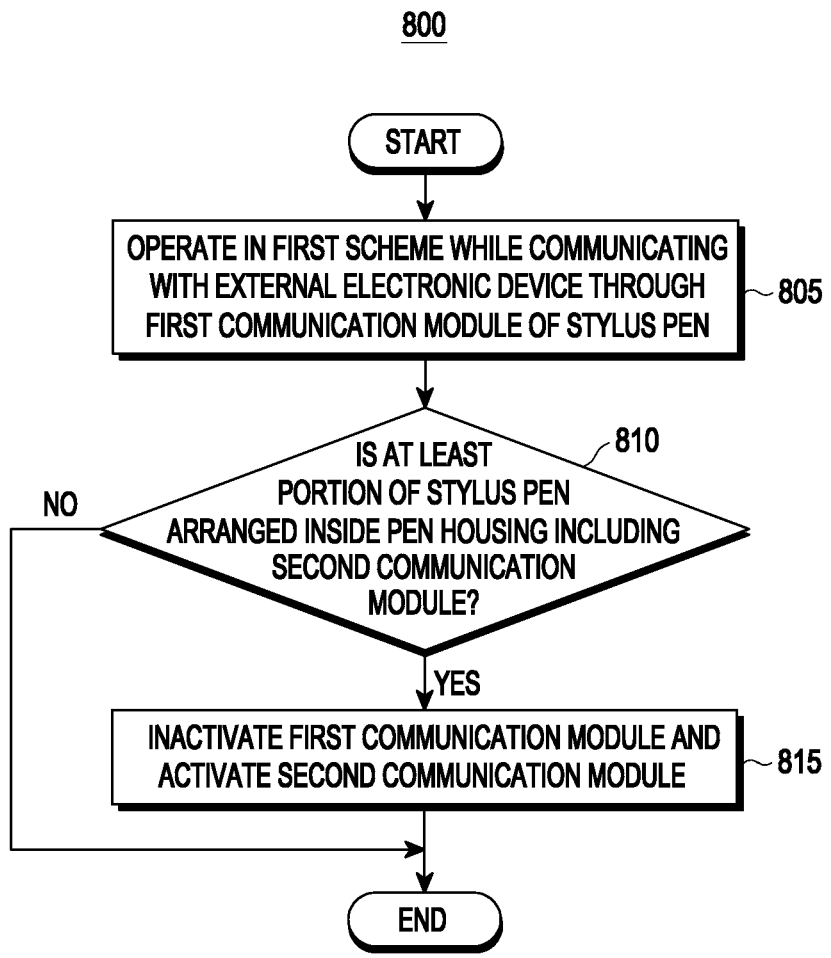
FIG. 8 is a flowchart illustrating an operation of an input device operating based on a coupling state with a pen housing according to various example embodiments.

FIG. 8 is a flowchart 800 illustrating an operation of an input device operating based on a coupling state with a pen housing according to various embodiments. Here, an electronic device (e.g., the input device 401) may include a stylus pen (e.g., the digital pen 201), and a pen housing (e.g., the pen housing 400a or the pen housing 400) may be coupled to the stylus pen. According to an embodiment, the stylus pen may be referred to as the input device 401 regardless of whether the stylus pen is coupled to the pen housing, or the stylus pen coupled to the pen housing may be referred to as the input device 401. Each step/operation of an operation method may be performed by at least one of input devices (e.g., the input device 401 of FIG. 4 and the processor 420 of the input device 401 of FIG. 4).

Referring to FIG. 8, in operation 805, the input device 401 may operate in a first scheme while communicating with a first electronic device through a first communication module (e.g., the first communication circuit 490) of the stylus pen.

In operation 810, the input device 401 may detect whether at least a portion of the stylus pen is arranged inside a pen housing including a second communication module (e.g., the second communication circuit 490a).

According to an embodiment, the input device 401 may detect that the stylus pen is coupled to the pen housing when the at least a portion of the stylus pen is arranged inside the pen housing. According to an embodiment, the input device 401 may include a switch configured to detect that the pen housing is coupled to the stylus pen. The input device 401 may include a sensor (e.g., a hall sensor) configured to detect the coupling in addition to a physical switch and may detect that the pen housing is coupled to the stylus pen based on a sensing result of the sensor. According to an embodiment, when detecting that the stylus pen is coupled to the pen housing, the input device 401 may authenticate whether the pen housing is an accessory device that can be coupled with the stylus pen. For example, the input device 401 may read the identification information recorded on the RFID tag in the pen housing, and may identify whether the identification information recorded on the RFID tag matches the previously stored identification information. When the identification information recorded in the RFID tag matches the stored identification information, the input device 401 may authenticate that the pen housing is the accessory device that can be coupled to the stylus pen.

In response to the at least a portion of the stylus pen being arranged inside the pen housing, in operation 815, the input device 401 may inactivate the first communication module and may activate the second communication module. According to an embodiment, in response to the at least a portion of the stylus pen being arranged inside the pen housing, when the authentication is successful, the input device 401 may activate the second communication module to initiate to search for the second electronic device, and may be paired with the second electronic device.

According to various embodiments, the method may include communicating with a second electronic device through the second communication module when the first communication module is inactivated, and operating in the first scheme or a second scheme while communicating with the second electronic device through the second communication module.

According to various embodiments, the first communication module and the second communication module are configured to operate based on Bluetooth low energy (BLE).

According to various embodiments, the first scheme or the second scheme may be at least one of an electromagnetic resonance (EMR) scheme, an active electrostatic (AES) scheme, or an electrically coupled resonance (ECR) scheme.

According to various embodiments, the pen housing may include a first pen housing into which a first portion of the stylus pen is inserted, and a second pen housing into which a second portion of the stylus pen is inserted and which is coupled, directly or indirectly, to the first pen housing.

According to various embodiments, the second pen housing may be coupled to, directly or indirectly, the first pen housing including a storage space in which the second communication module is arranged and the first portion of the stylus pen is accommodated therein, through a coupling member.

According to various embodiments, the pen housing may include a radio frequency identification (RFID) tag on which predetermined identification information is recorded, and the stylus pen may include an RFID reader configured to reads the identification information recorded on the RFID tag.

According to various embodiments, the method may further include authenticating the pen housing based on the identification information read by the RFID reader in response to the at least a portion of the stylus pen being arranged inside the pen housing.

According to various embodiments, the inactivating of the first communication module and the activating of the second communication module may include detecting coupling with the pen housing when the at least a portion of the stylus pen is arranged inside the pen housing, using a switch configured to detect whether the stylus pen is coupled to the pen housing by a depressible button being pressed when the depressible pen provided at one end of the stylus pen is pressed by the coupling with the pen housing, disconnecting communication with the first electronic device through the first communication module when the coupling with the pen housing is detected using the switch, and communicating with the second electronic device through the second communication module after disconnecting communication with the first electronic device.

Figure 9:
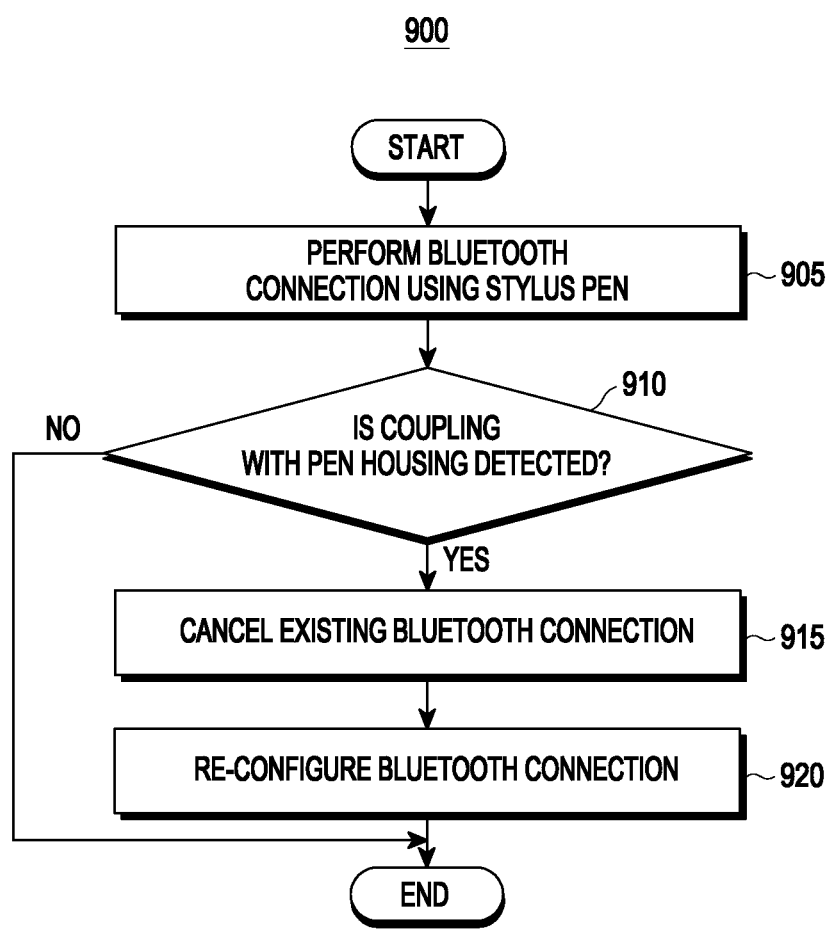
FIG. 9 is a flowchart illustrating a detailed operation of an input device operating based on a coupling state with a pen housing according to various example embodiments.

FIG. 9 is a flowchart 900 illustrating a detailed operation of an input device operating based on a coupling state with a pen housing according to various embodiments. The operation method may include operations 905 to 920. In an embodiment, at least one of operations 905 to 920 may be omitted, the order of some operations may be changed, or another operation may be added.

Referring to FIG. 9, in operation 905, the input device 401 may perform a Bluetooth connection using a stylus pen (e.g., the digital pen 201). According to an embodiment, the stylus pen may communicate with a first electronic device (e.g., the electronic device 101) through Bluetooth-based communication through the first communication circuit 490 of the stylus pen.

In operation 910, the input device 401 may identify whether coupling with a pen housing (e.g., the pen housing 400a of FIG. 5A or the pen housing 400 of FIGS. 5B and 5C) is detected. According to an embodiment, the input device 401 may identify whether at least a portion of the stylus pen is accommodated in the pen housing. Alternatively, the input device 401 may identify whether the pen housing is coupled to one end of the stylus pen through a coupling member.

In operation 915, in response to the detection of coupling with the pen housing, the input device 401 may cancel the existing Bluetooth connection. According to an embodiment, the input device 401 may cancel the Bluetooth connection with the first electronic device through the first communication circuit 490 in the stylus pen. For example, the input device 401 may cancel pairing with the first electronic device.

In operation 920, the input device 401 may re-configure the Bluetooth connection. According to an embodiment, the input device 401 may attempt a Bluetooth connection with the second electronic device (e.g., the electronic device 104) through the second communication circuit 490a in the pen housing. According to an embodiment, the input device 401 may cancel the Bluetooth connection with the first electronic device after searching for the second electronic device and the Bluetooth connection with the second electronic device is completed, whereby the first communication circuitry 490 may be inactivated.

Figure 10:
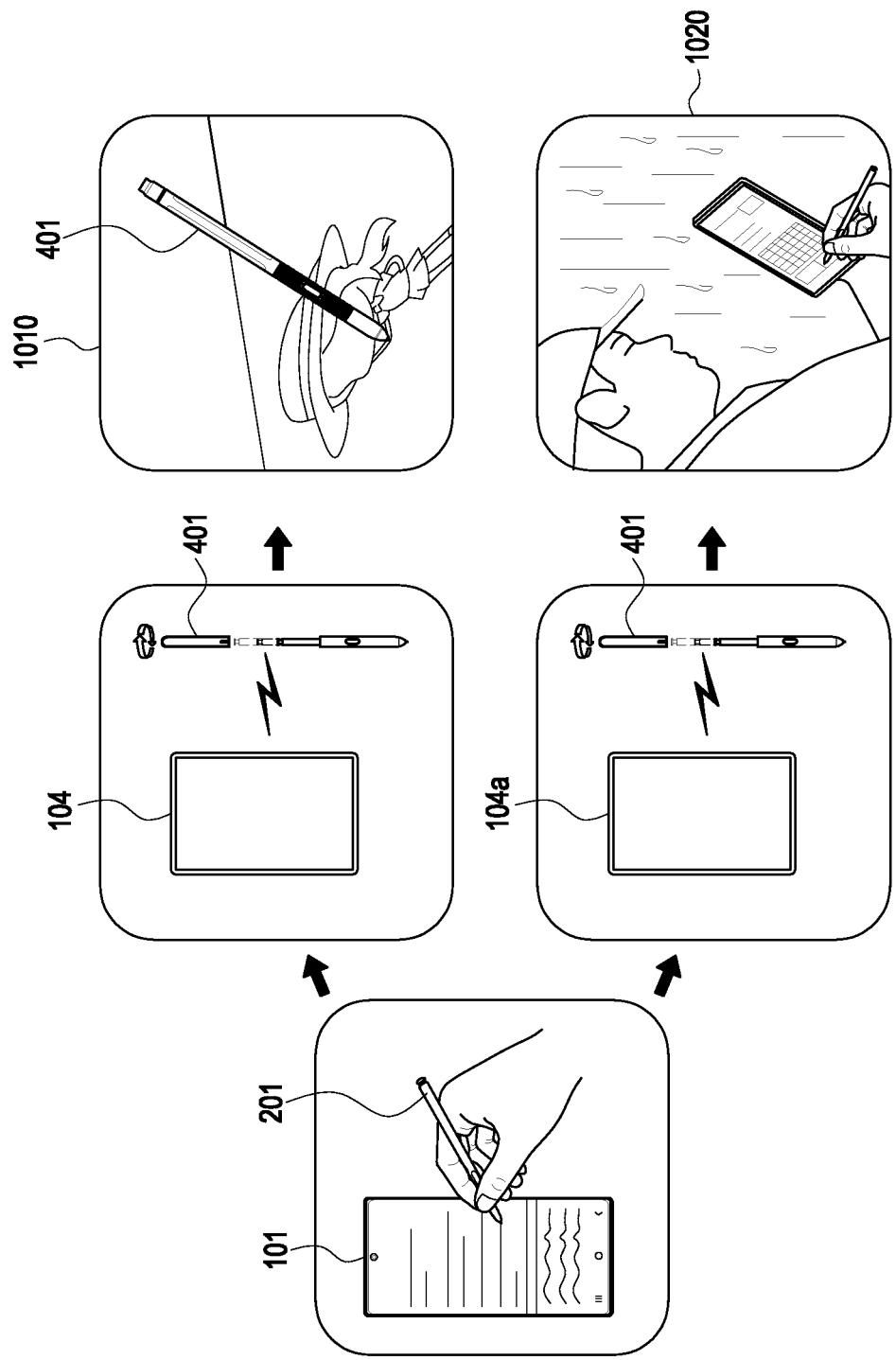
FIG. 10 is a diagram illustrating embodiments in which an input device according to various example embodiments is used.

FIG. 10 is a diagram illustrating embodiments in which an input device according to various embodiments is used. According to an embodiment, the input device 401 may be a device supporting Bluetooth communication and may be a device subordinate to the first electronic device 101.

Referring to FIG. 10, the stylus pen 201 may be paired with the first electronic device 101 when the pen housing is not coupled. In a state of being paired with the first electronic device 101, the user can use the stylus pen 201.

According to an embodiment, when the pen housing is coupled to the stylus pen 201, the input device 401 may be paired with the second electronic device 104 or paired with another third electronic device 104a. For example, in a case in which the type of the second electronic device 104 is a tablet and the second electronic device 104 is equipped with a professional drawing function, during pairing with the input device 401, the user may use the input device 401 to perform drawing in 1010 on the second electronic device 104. For example, in a case in which the type of the third electronic device 104a is a rugged phone and a rugged mode for work is equipped, during pairing with the input device 401, the user may use the input device 401 to use a function through interworking with software specialized for a work site in the third electronic device 104a.

FIG. 11 is an exemplary diagram illustrating a screen of an electronic device when pairing with an input device according to various embodiments is canceled.

Figure 11A:
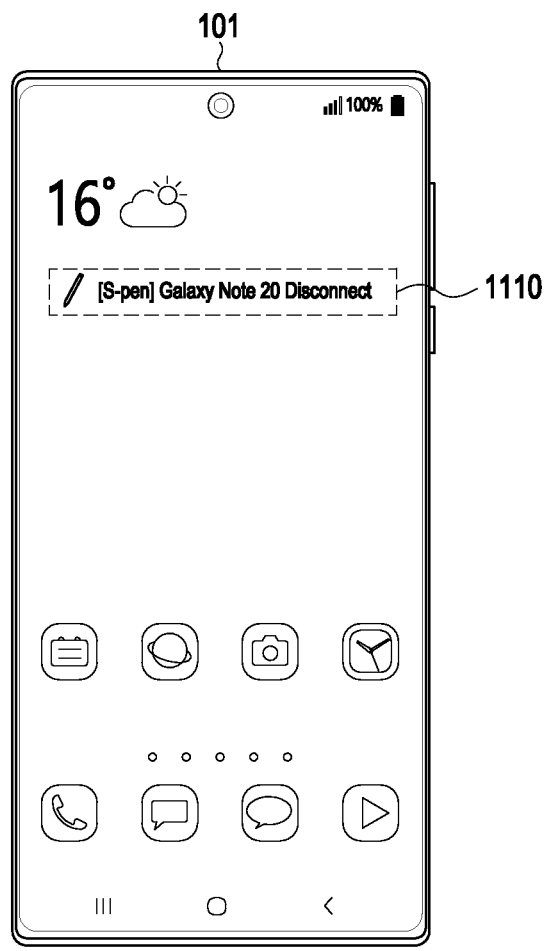
FIGS. 11(*a*)-(*b*) are an exemplary diagram(s) illustrating a screen of an electronic device when pairing with an input device according to various example embodiments is canceled.
Figure 11B:
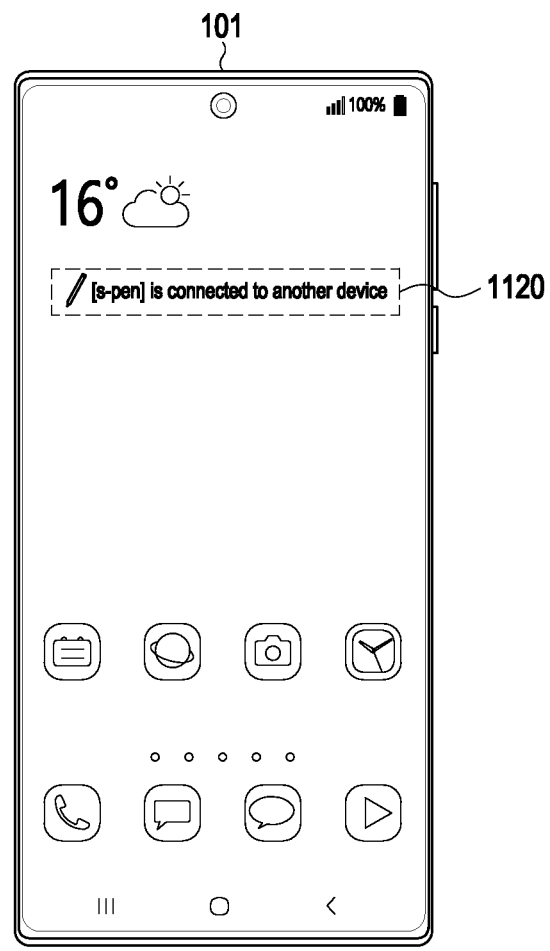

FIG. 11A illustrates a screen corresponding to cancellation of pairing between the input device 401 (e.g., a stylus pen) and the first electronic device 101, and FIG. 11B illustrates a screen corresponding to completion of pairing with the second electronic device 104 instead of the first electronic device 101. According to an embodiment, the input device 401 in FIG. 11B may be in a state in which a pen housing (e.g., the pen housing 400a of FIG. 5a or the pen housing 400 of FIGS. 5B and 5C) is coupled to the stylus pen 201.

As shown in FIG. 11A, when the pairing between the input device 401 (e.g., stylus pen) and the first electronic device 101 is cancelled, the first electronic device 101 may display a message 1110 notifying the cancellation of the paring. Alternatively, the first electronic device 101 may display a message 1110 notifying the cancellation of the pairing based on completion of pairing between the input device 401 and the second electronic device 104.

In addition, as shown in FIG. 11B, as the input device 401 (e.g., a stylus pen to which the pen housing is coupled) is paired with the second electronic device 104, the first electronic device 101 may display a message 1120 notifying the completion of the paring. As described above, by notifying the first electronic device to which the input device 401 is subordinate that the pairing is cancelled and then the input device 401 is connected to the second electronic device 104, the user may recognize that a stylus pen subordinate to a specific type of first electronic device (e.g., a smartphone) can be used in a different type of second electronic device (e.g., a tablet, a rugged phone, or a laptop computer). For example, when a user loses a stylus pen for a laptop in the laptop equipped with the stylus pen, the user can couple the pen housing to the stylus pen used in a smartphone and use the stylus pen as is in the laptop, thereby improving convenience in use.

FIG. 12 is an exemplary diagram illustrating a screen of a first electronic device in which pairing with an input device according to various embodiments is canceled and a screen of a second electronic device paired with the input device.

Figure 12A:
FIGS. 12(*a*)-(*b*) are an exemplary diagram(s) illustrating a screen of a first electronic device in which pairing with an input device according to various example embodiments is canceled and a screen of a second electronic device paired with the input device.
Figure 12B:
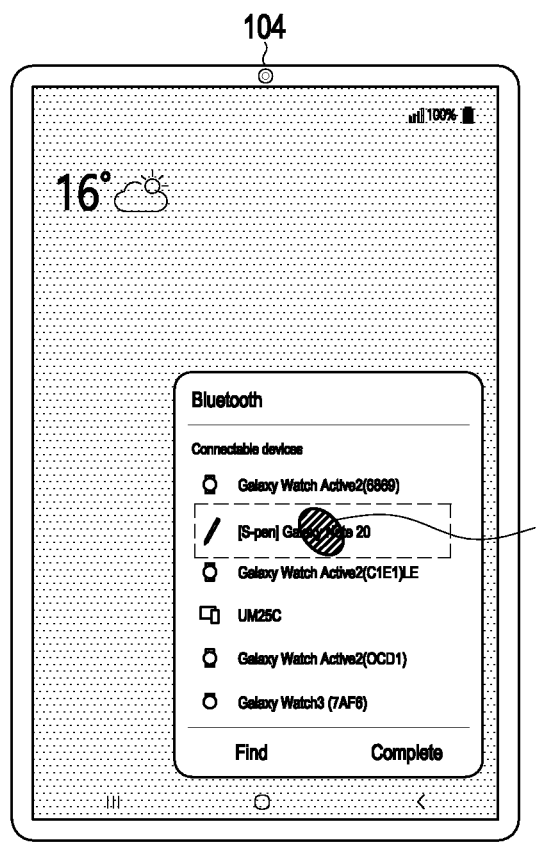

FIG. 12A illustrates a screen corresponding to cancellation of pairing between the input device 401 (e.g., stylus pen) and the first electronic device 101, and FIG. 12B illustrates a screen when the input device 401 is paired with the second electronic device 104 instead of the first electronic device 101. According to an embodiment, the input device 401 in FIG. 12 B may be in a state in which a pen housing (e.g., the pen housing 400a of FIG. 5a, the pen housing 400 of FIGS. 5b and 5c) is coupled to the stylus pen 201.

According to various embodiments, the input device 401 in a state in which the pen housing is coupled to the stylus pen may request disconnection of communication for pairing with the second electronic device 104. The request for disconnection of communication may include at least one of information related to coupling of the pen housing or information notifying that the corresponding request is a request for pairing with another electronic device.

As shown in FIG. 12A, the first electronic device 101 may receive the request for disconnection of communication from the input device 401, and in response to the request for disconnection, the first electronic device 101 may display a message 1210 asking whether to approve the usage in another electronic device. According to an embodiment, a screen related to pairing may be displayed only on the paired second electronic device 104 without displaying the message asking whether to approve the usage on the first electronic device 101.

As shown in FIG. 12B, the second electronic device 104 may display a list of devices connectable via Bluetooth, and in response to reception of a user selection 1220 for the input device 401 in the device list, pairing between the input device 401 and the second electronic device 104 may be completed. When the pairing is completed, the user can use the pen functionality that can be supported by the second electronic device 104 using the input device 401. For example, when the second electronic device 104 supports a drawing function, the user can draw a picture using the input device 401. In this manner, according to various embodiments, by coupling the detachable pen housing to a stylus pen usable only in a specific type of electronic device, the stylus pen in the coupled state can be easily used in other electronic devices, thereby significantly improving the accessibility of the input device and providing a more improved smart user experience.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. "Based on" as used herein covers based at least on.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:
1. An electronic device comprising:
   a stylus pen comprising first communication circuitry configured to communicate with a first electronic device, and a control circuit configured to activate or inactivate the first communication circuitry; and
   a pen housing comprising second communication circuitry configured to communicate with a second electronic device different from the first electronic device, and configured for at least a portion of the stylus pen to be arranged at least partially inside the pen housing,
   wherein the control circuit is configured to, in response to the at least a portion of the stylus pen being arranged at least partially inside the pen housing, inactivate the first communication circuitry to disconnect communication with the first electronic device and activate the second communication circuitry to connect communication with the second electronic device,
   wherein the pen housing comprises a radio frequency identification (RFID) tag on which predetermined identification information is recorded, and
   the stylus pen comprises an RFID reader configured to read the identification information recorded on the RFID tag.

2. The electronic device of claim 1, wherein the control circuit is configured to operate in a first scheme by communicating with a first electronic device via the first communication circuitry, and operate in the first scheme and/or a second scheme by communicating with a second electronic device via the second communication circuitry in a case that the first communication circuitry is inactivated.

3. The electronic device of claim 2, wherein the first communication circuitry and the second communication circuitry are configured to operate based on Bluetooth low energy (BLE).

4. The electronic device of claim 2, wherein the first scheme and/or the second scheme is at least one of: an electro-magnetic resonance (EMR) scheme, an active electrostatic (AES) scheme, or an electrically coupled resonance (ECR) scheme.

5. The electronic device of claim 1, wherein the pen housing comprises a structure that is attached to or detachable from the stylus pen.

6. The electronic device of claim 1, wherein the pen housing comprises a first pen housing into which a first portion of the stylus pen is to be inserted, and a second pen housing into which a second portion of the stylus pen is to be inserted and which is coupled to the first pen housing, and
the second pen housing is coupled to the first pen housing comprising a storage space in which the second communication circuitry is arranged and the first portion of the stylus pen is to be accommodated therein, via at least a coupling member.

7. The electronic device of claim 1, wherein the control circuit is configured to authenticate the pen housing based on the identification information read by the RFID reader in response to the at least a portion of the stylus pen being arranged inside the pen housing.

8. The electronic device of claim 1, wherein the stylus pen comprises a switch configured to detect, in case that a depressible button provided at one end of the stylus pen is pressed by coupling of the stylus pen with the pen housing, whether the stylus pen is coupled to the pen housing by the depressible button being pressed.

9. The electronic device of claim 8, wherein, in a case in which the at least a portion of the stylus pen is arranged inside the pen housing, the control circuit is configured to inactivate the first communication circuitry and activate the second communication circuitry in a case that the coupling of the stylus pen with the pen housing is detected using the switch.

10. An operation method of an electronic device comprising a stylus pen, the operation method comprising:
operating in a first scheme while communicating with a first electronic device via a first communication circuitry of the stylus pen;
detecting that at least a portion of the stylus pen is arranged at least partially inside a pen housing of the electronic device comprising a second communication circuitry; and
based on the detecting that the at least a portion of the stylus pen is arranged at least partially inside the pen housing, inactivating the first communication circuitry to disconnect communication with the first electronic device and activating the second communication circuitry to connect communication with the second electronic device,
the method further comprising:
in response to the at least a portion of the stylus pen being arranged at least partially inside the pen housing, authenticating the pen housing at least by reading identification information recorded on a radio frequency identification (RFID) tag included in the pen housing by an RFID reader included in the stylus pen.

11. The operation method of claim 10, further comprising:
communicating with a second electronic device via the second communication circuitry in a case that the first communication circuitry is inactivated; and
operating in the first scheme and/or a second scheme while communicating with the second electronic device via the second communication circuitry.

12. The operation method of claim 11, wherein the first communication circuitry and the second communication circuitry are configured to operate based on BLE, and the first scheme and/or the second scheme is at least one of: an EMR scheme, an AES scheme, or an ECR scheme.

13. The operation method of claim 10, wherein the inactivating of the first communication circuitry and the activating of the second communication circuitry comprises:
detecting coupling with the pen housing in a case that the at least a portion of the stylus pen is arranged inside the pen housing, using a switch configured to detect whether the stylus pen is coupled to the pen housing by a depressible button being pressed in case that the depressible pen provided at one end of the stylus pen is pressed by the coupling with the pen housing;
disconnecting communication with the first electronic device via the first communication circuitry in a case that the coupling with the pen housing is detected using the switch; and
communicating with the second electronic device via the second communication circuitry after disconnecting communication with the first electronic device.

* * * * *